(12) United States Patent
Montipo

(10) Patent No.: US 7,441,561 B2
(45) Date of Patent: Oct. 28, 2008

(54) REINFORCED VALVE ASSEMBLY

(75) Inventor: Fulvio Montipo, Reggio Emilia (IT)

(73) Assignee: Interpump Engineering S.R.L., Reggio Emilia (IT)

( * ) Notice: Subject to any disclaimer, the term of this patent is extended or adjusted under 35 U.S.C. 154(b) by 358 days.

(21) Appl. No.: 11/084,514

(22) Filed: Mar. 18, 2005

(65) Prior Publication Data
US 2005/0226753 A1    Oct. 13, 2005

Related U.S. Application Data

(60) Provisional application No. 60/554,698, filed on Mar. 19, 2004.

(51) Int. Cl.
*F16K 15/02* (2006.01)
(52) U.S. Cl. .................................. 137/543.19; 251/368
(58) Field of Classification Search .............. 137/543.9, 137/540; 251/368
See application file for complete search history.

(56) References Cited

U.S. PATENT DOCUMENTS

| | | | | |
|---|---|---|---|---|
| 765,541 A * | 7/1904 | Beers | ..................... | 137/543.19 |
| 1,014,178 A * | 1/1912 | Roberts | ................. | 137/543.19 |
| 1,359,006 A * | 11/1920 | Wardwell | ............... | 137/516.15 |
| 2,609,175 A * | 9/1952 | Von Kokeritz et al. | . | 137/543.19 |
| 2,710,022 A * | 6/1955 | Gibbs | ..................... | 137/543.19 |
| 3,219,057 A * | 11/1965 | Knowles | ................. | 137/543.19 |
| 3,395,890 A * | 8/1968 | Eckert et al. | ................. | 251/368 |
| 3,771,765 A * | 11/1973 | Scapes | ........................ | 251/368 |
| 4,454,954 A * | 6/1984 | Willis | .......................... | 215/21 |
| 4,815,493 A * | 3/1989 | Miller et al. | ............ | 137/543.19 |
| 5,546,981 A * | 8/1996 | Li et al. | .................. | 137/543.19 |
| 6,484,753 B1 * | 11/2002 | Shimizu et al. | ........ | 137/625.17 |
| 2004/0132907 A1 * | 7/2004 | Nakamura et al. | ............ | 525/88 |

* cited by examiner

*Primary Examiner*—John Rivell
(74) *Attorney, Agent, or Firm*—Oppenheimer Wolff & Donnelly LLP; Adam P. Kiedrowski

(57) ABSTRACT

The present disclosure is directed to a valve assembly comprising a housing and a valve mechanism. The housing includes a pair of support rings connected together with a set of legs. The valve mechanism is supported within the housing and includes an open position and a closed position. The valve mechanism is constructed and arranged such that when in the open position, fluid is allowed to flow through the valve mechanism into the housing and exit the housing between the legs. More than four legs extend between the first support ring and the second support ring, the legs arranged circumferentially such that the legs are substantially equally spaced around the housing.

9 Claims, 4 Drawing Sheets

REINFORCED VALVE ASSEMBLY

REFERENCE TO CO-PENDING APPLICATION

This patent application claims the benefit of prior U.S. provisional application filed on Mar. 19, 2004, having Ser. No. 60/554,698, and titled "High Temperature Valve Assembly".

BACKGROUND

The present disclosure relates to valve assemblies for opening or closing fluid paths. More particularly, the present disclosure relates to valve assemblies, such as check valves, adapted for use with plunger pumps for high temperature and high stress applications such as car washes, and the like.

Fluid pumps are often described by the type of motion used, displacement, mechanism, cylinders and pressure. For example, a reciprocating pump converts rotary driving motion from a motor, or the like, to a linear pumping motion with a pumping mechanism. Driving speed of the motor in revolutions per minute is often directly related to the output of the reciprocating pump. A reciprocating positive displacement pump first moves fluids into the pump, and then the fluids are moved out of the pump. Plunger pumps are reciprocating positive displacement pumps that displace a given amount of fluid on each cycle, or stroke, of the plunger. The reciprocating motion of the plunger, with check valves on each side of the pump body, creates the pumping action of the fluid. On the suction stroke, or up stroke, low pressure in the pump body closes a discharge, or outlet, check valve, opens a suction, or inlet, check valve, and pulls fluid into a pump cylinder in one example. On the discharge stroke, or down stroke, high pressure in the pump body closes the suction check valve, opens the discharge check valve, and pushes the fluid out of the pump cylinder in the example. Typically, these pumps include one to six cylinders. A simplex pump may only include one cylinder, but a more common configuration is a triplex pump with three cylinders. When pump forces fluid through a restriction in excess of about 150 pounds per square inch, the pump is often termed a high-pressure pump.

Plunger pumps include several advantages, and a few of these advantages are listed here. Plunger pumps provide a constant flow of fluid at high pressures over long periods of time, and they can operate without fluid allowing them to operate unattended. Also, plunger pumps are adapted to vary the amount of flow without having to vary the speed of the drive motor. Also, plunger pumps are durable and can operate in a variety of conditions. Several of the many applications of plunger pumps include septage and sludge, water treatment, desalination, and industrial cleaning such as car wash systems.

Car wash systems are a particularly useful and demanding application for plunger pumps. Plunger pumps in car wash systems are typically required to pump water at high temperatures, such as greater than approximately 165 degrees (about 74 degrees Celsius) Fahrenheit and often up to approximately 185 degrees Fahrenheit (about 85 degrees Celsius). These high temperatures sometimes cause premature damage to some of the internal components of the plunger pump, such as the check valves described above.

FIG. 1 shows an example of a prior art check valve assembly 10 that is provided here to illustrate how high temperatures sometimes cause premature damage. The check valve assembly 10 includes a housing 12 that surrounds and supports a spring-loaded valve mechanism 13. The check valve assembly 10 is adapted to permit fluid to flow through the housing 12 when the valve mechanism 13 is open. The valve mechanism 13 includes a spring 14 that biases a valve plate 15 against a valve seat 16. The housing includes a spring guide 17 that maintains the proper position of the spring 14 within the housing 12. The housing includes a first support ring 18 distal to the valve seat 16 and a second support ring 19 proximate to the valve seat 16. No more than four legs 20, are coupled to and extend between the support rings 18, 19. The legs 20 are spaced-apart around the support rings 18, 19. The legs 20 and support rings 18, 19 provide the structural integrity of the valve assembly and are referred to as the valve cage. A stop ring 21 is also included in the valve cage to prevent over-travel of the valve plate 15 and to define a fully open position of the check valve assembly 10. Water flows between the second support ring 19 and the valve plate 15 and in through a hole 22 in the valve seat.

The prior art check valve assembly 10 has proven itself effective in low temperature applications, but it has a tendency to develop stress fractures when used in high temperature applications. Specifically, the stress fractures typically occur on the second ring 19 in between the legs 20 as a result of high temperature applications and fluid cavitation.

Initial attempts to correct this problem have failed or have compromised the efficiency of the check valve assembly. For example, one proposed solution by those skilled in the art involved increasing the height of the second ring 19. This proposed solution failed to prevent stress fractures after testing. Further, the flow characteristics of the check valve assembly were adversely affected and reduced the fluid flow through the housing when the valve plate 15 was in an open position. Another proposed solution by those skilled in the art was to increase the width of each leg 20. This proposed solution also restricted flow of fluid through the check valve assembly as it narrowed the spacing between each leg.

Accordingly, there is a need for a reinforced check valve assembly that resists stress fractures as a result of high temperature applications and fluid cavitation, and that does not reduce fluid flow capacity. The check valve assembly should also be close enough to the external dimensions of existing check valve assemblies so as to be interchangeable in existing plunger pumps.

SUMMARY

The present disclosure is directed to a valve assembly comprising a housing and a valve mechanism. The housing includes a pair of support rings connected together with a plurality of legs. The valve mechanism is supported within the housing and includes an open position and a closed position. The valve mechanism is constructed and arranged such that when in the open position, fluid is allowed to flow through the valve mechanism into the housing and exit the housing between the legs. More than four legs extend between the first support ring and the second support ring, the legs arranged circumferentially such that the legs are substantially equally spaced around the housing.

The check valve assembly of the present disclosure meets the above needs by providing a valve assembly with an improved housing design. In addition to providing the features of the prior art housing, one aspect of the present disclosure provides six rather than four legs. Despite conventional wisdom of those skilled in the art, the six legs do not restrict the flow space from the prior art. The legs in this aspect are narrower than the legs of the prior art. Surprisingly neither the strength of the legs or the strength of the second ring are reduced in this aspect. Rather, the check valve assembly is able to withstand high temperatures and cavitation to retain a longer lifespan than the prior art, and the check valve assembly uses the same valve mechanism components and is interchangeable with existing pumps.

DESCRIPTION

This disclosure relates to valve assemblies. The disclosure, including the figures, describes the valve assembly with reference to an illustrative example. For example, the disclosure proceeds with respect to a valve assembly used in a plunger pump mechanism of a car wash system described below. However, it should be noted that the present invention could be implemented in other systems or pump mechanisms, as well. The present invention is described with respect to the plunger pump mechanism in a car wash system for illustrative purposes only. Other examples are contemplated and are mentioned below or are otherwise imaginable to someone skilled in the art. The scope of the invention is not limited to the few examples, i.e., the described embodiments of the invention. Rather, the scope of the invention is defined by reference to the appended claims. Changes can be made to the examples, including alternative designs not disclosed, and still be within the scope of the claims.

Figure 1:
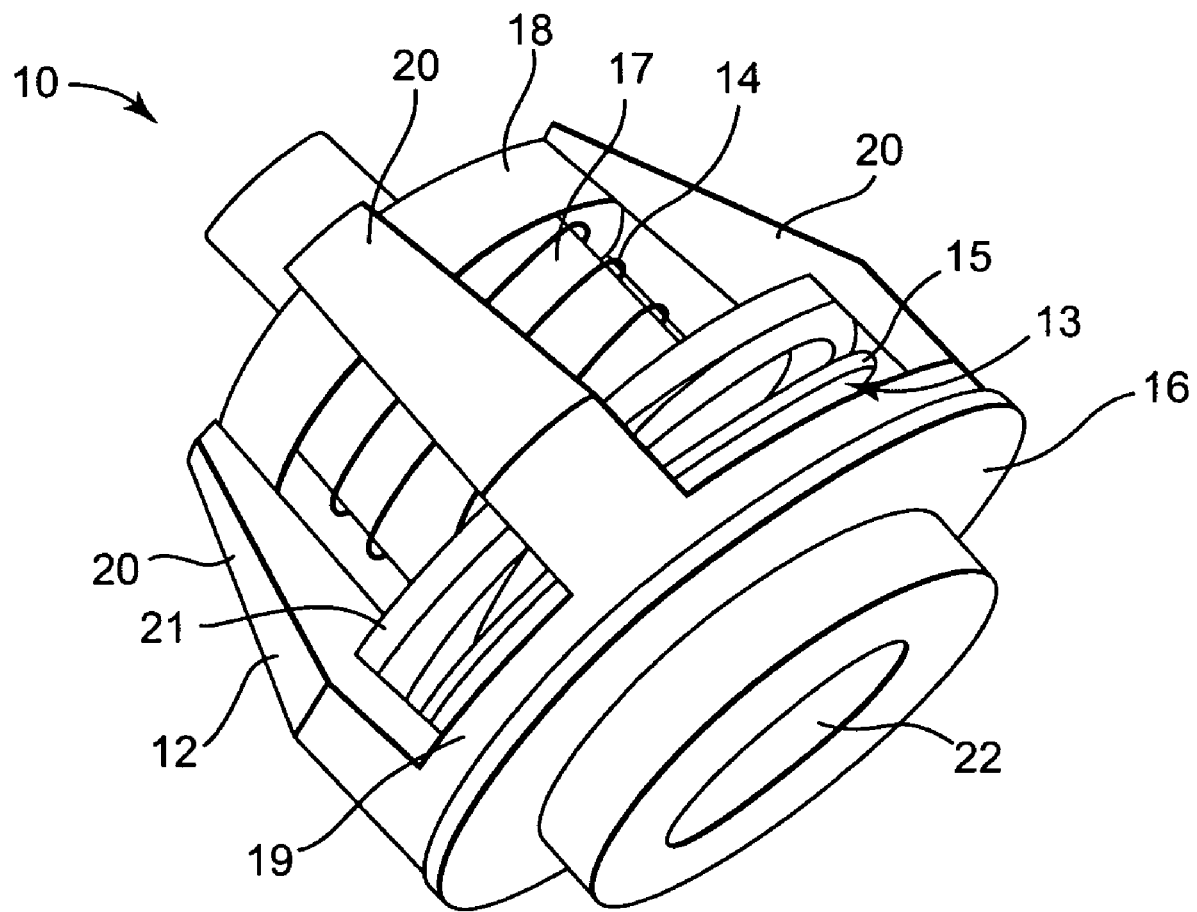
FIG. 1 is perspective view of a prior art valve assembly.
Figure 2:
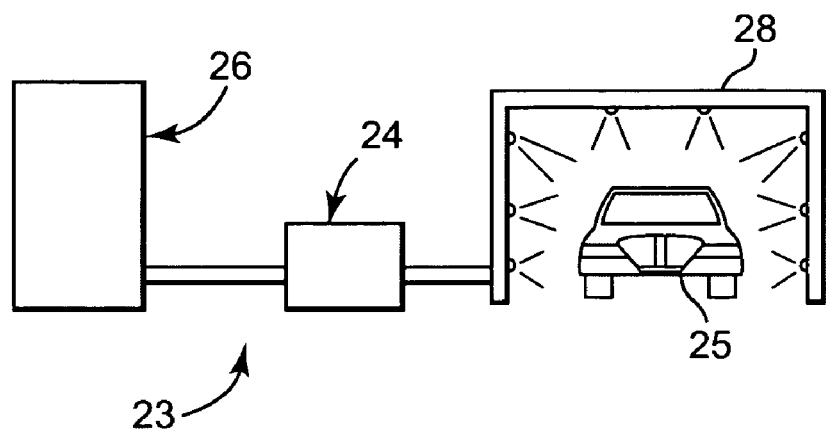
FIG. 2 is a schematic drawing of an environment of the present disclosure.

FIG. 2 shows a schematic view of a car wash 23, which is one example of an environment of the present disclosure. The car wash can include an automatic, manual, or conveyor type car wash. Other types of industrial cleaning systems, or high temperature fluid systems are also suitable for the present environment. The car wash 23 includes a pump 24 coupled to a heated water supply 26 and receives water from the water supply 26. Typically, the water supply 26 can be heated to approximately 185 degrees Fahrenheit (about 85 degrees Celsius) and the pump 24 is adapted for high temperature conditions, and possibly for high-pressure conditions. The pump 24 provides the water to the nozzles 28 that are adapted to spray the water onto a vehicle 25 in the car wash 23.

Figure 3:
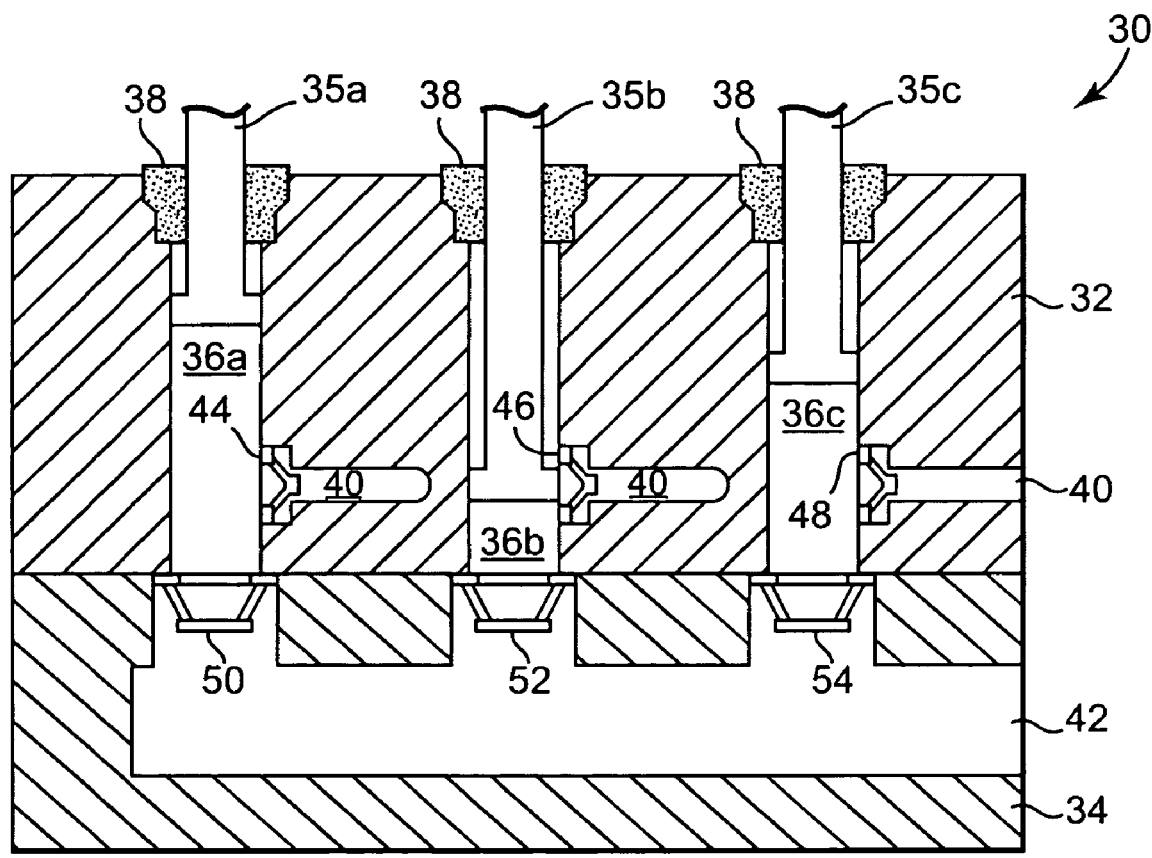
FIG. 3 is a cross-sectioned plan view of a plunger pump including features of the present disclosure.

FIG. 3 shows a general schematic diagram of a pump 30, which is an example of pump 24 shown in FIG. 2. The pump 30 includes a pump housing 32 and an outlet manifold 34. A first plunger 35*a*, second plunger 35*b* and third plunger 35*c* are illustrated in this example. The plungers 35*a*, 35*b*, 35*c*, extend within a first chamber 36*a*, second chamber 36*b* and third chamber 36*c*, respectively. The chambers, or cylinders, also include seal stacks 38. The pump 30 has an inlet 40 for providing a supply of fluid, and an outlet 42 for providing the pressurized fluid to subsequent devices, such as the nozzle 28. In the example, the housing 32 is configured so that housing inlet 40 is in communication with first chamber 36*a*, second chamber 36*b* and third chamber 36*c*, so that fluid can be provided to each of these chambers.

The pump also includes a plurality of check valve assemblies. In the example, two check valve assemblies are coupled to each chamber. A first inlet check valve assembly 44 is disposed proximate the first chamber 36*a* near the inlet. Similarly, a second inlet check valve assembly 46 and a third inlet check valve assembly 48 are disposed proximate the first and second chambers 36*b*, 36*c*, respectively. Each chamber 36*a*, 36*b*, 36*c* also has an appropriate outlet check valve assembly. Chamber 36*a* includes a first outlet valve 50, chamber 36*b* includes a second outlet valve 52, and chamber 36*c* includes a third outlet valve 54.

Both the inlet valves 44, 46, 48 and the outlet valves 50, 52, 54 are one-way pressure activated valves that operate to allow fluid to move one direction while prohibiting its movement in an opposite direction. Fluid is drawn into the first chamber 36*a* when the first plunger 35*a* is in a down, or suction stroke. The negative pressure within the chamber 36*a* causes the inlet check valve assembly 44 to open and fluid enters the chamber 36*a* from the inlet 40. The negative pressure within the chamber 36*a* also causes the outlet check valve assembly 50 to close, so fluid does not exit the chamber 36*a* into the outlet 42. Fluid exits the first chamber 36*a* when the first plunger 35*a* is in an upstroke. The positive pressure within the chamber 36*a* causes the outlet check valve assembly 50 to open and fluid exits the chamber 36*a* into the outlet 42. The positive pressure within the chamber 36*a* also causes the inlet check valve assembly 44 to close, so fluid does not enter the chamber 36*a* from the inlet 40. The details of the check valve assemblies are described below.

Figure 4:
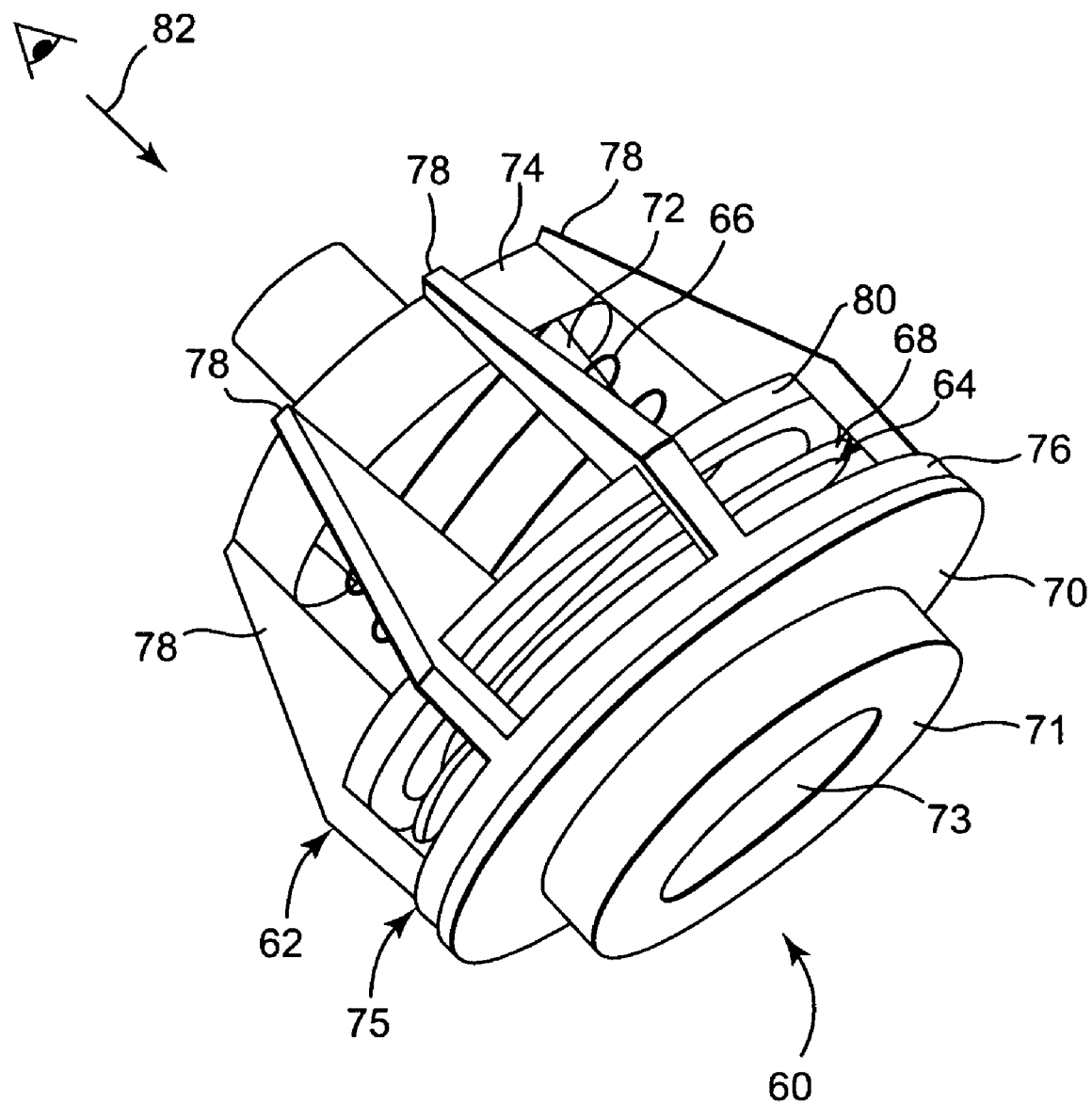
FIG. 4 is a perspective view of a valve assembly of the present disclosure shown in FIG. 3.

FIG. 4 shows a perspective view of the check valve assembly 60 that corresponds to and is a detailed view of inlet check valve assemblies and outlet check valve assemblies in FIG. 3. Check valve assembly 60 includes housing 62 that surrounds and supports a spring-loaded valve mechanism 64. The check valve assembly 60 is adapted to permit fluid through flow through the housing 62 when the valve mechanism 64 is open.

The valve mechanism 64 includes a spring 66 that biases a valve plate 68 against a valve seat 70. The valve plate 68 in the example does not include a stem, i.e., stemless, and can float freely within the housing. The spring 66 in the example is a coil spring that is disposed around a spring guide 72 that is coupled to the housing 62 to maintain the proper position of the spring 66. The spring 66 urges the valve plate 68 toward the valve seat 70. The valve seat 70 includes an annular member 71 on an outer face. The annular member 71 is adapted to accept an O-ring to help seal the valve assembly against the plunger pump. The annular member 71 also defines a passage 73 in the valve seat 70. Fluid can enter valve assembly 60 through the passage 73 and then pass into the housing. The valve assembly 60 is in a closed position when the valve plate 68 is urged up against the valve seat 70 to cover the passage 73, and the valve assembly 60 is in an open position when the valve plate 68 is spaced apart from the valve seat 70 by fluid pressure allowing fluid to pass through the passage and into the housing 62.

The housing 62 includes a plurality of support rings 74, 76 and more than four spaced-apart legs 78, that form a valve cage 75. The valve cage 75 provides the structural integrity of the valve assembly 60. The first support ring 74 is distal to the valve seat 70, and the second support ring 76 is proximate the valve seat 70. The first and second rings 74, 76 are generally co-axially located on the housing around the coil spring 66. The first and second rings 74, 76 are generally in parallel planes to one another. The legs 78 extend axially and are connected to the first and second rings 74, 76. In the example shown, the housing includes six legs 78, although a valve housing including five or more legs is contemplated. In the example shown, the valve seat 70 is snap-fit within the second support ring for easy assembly. The housing 62 also includes a stop ring 80 that is coaxially located with the first and second rings 74, 76 and between them. The stop ring 80 is connected to the legs 78 at an intermediate portion. The stop ring 80 is included in the housing 62 to prevent over-travel of the valve plate 64 and to define a fully open position of the check valve assembly 60. Fluid flows around the legs 78 between the second support ring 76 and the valve plate 68 and in through the passage 73 in the valve seat 70.

Figure 5:
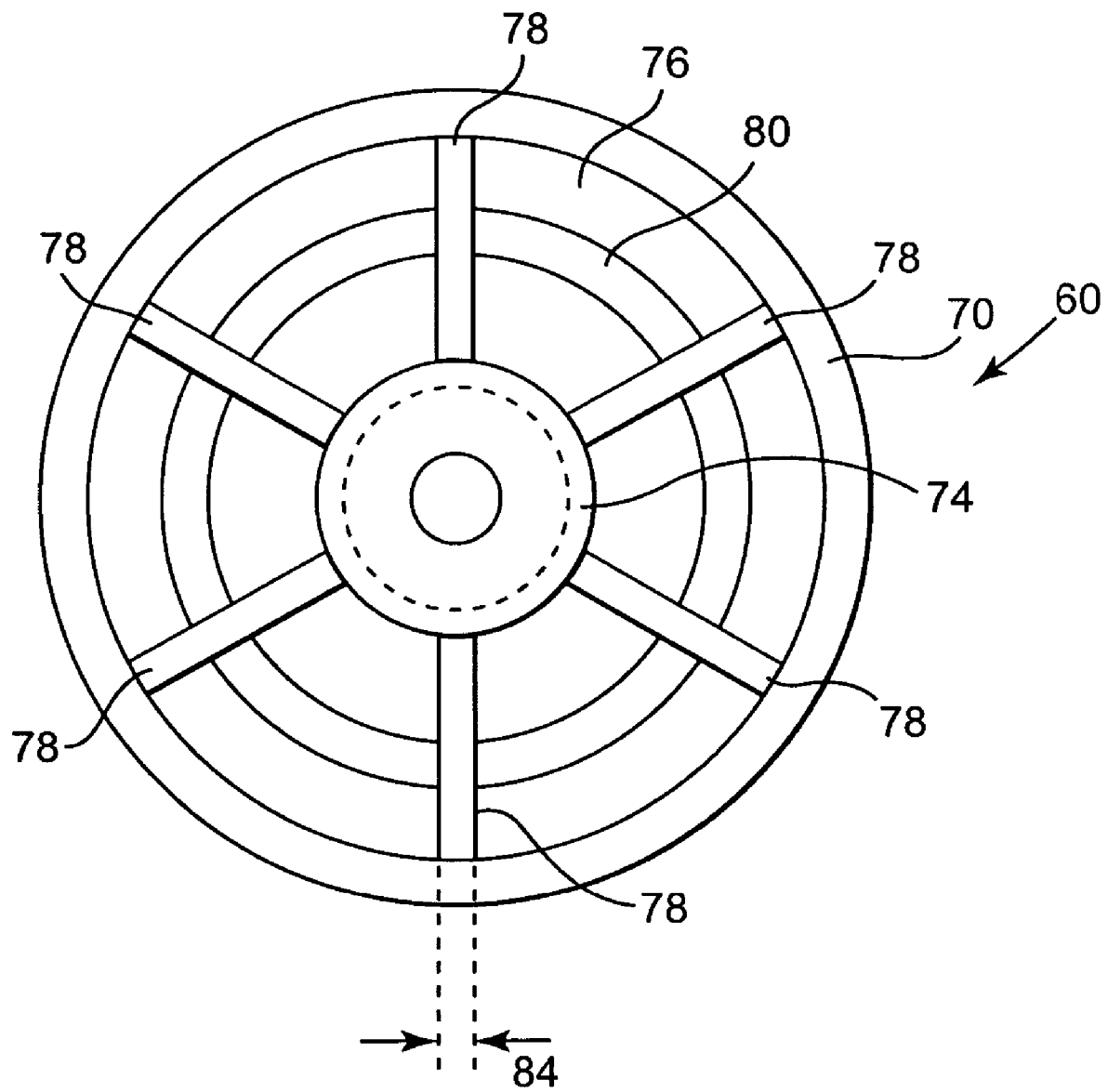
FIG. 5 is a plan view of the valve assembly of FIG. 4.

FIG. 5 is a plan view of the check valve assembly 60 taken along line of sight 82 in FIG. 4. The legs 78 in the example are spaced-apart at equal angular intervals. In this case, the centers of the legs are spaced apart at approximately sixty-degree intervals. The width of the legs 78, as indicated at 84, is approximately one-seventh of the diameter of the passage 73. Further, the maximum distance between the valve plate 68 and the second support ring 76, in this example, is about the width of the legs, or about one-seventh of the diameter of the passage 73. The example shows the legs 78 to have approximately equal thickness. It is contemplated that the thickness of the legs can vary, in which case the average thickness of the plurality of legs can be used to calculate the appropriate dimensions of the valve assembly. The described dimensions of the valve assembly 60 in the example provides the appropriate flow capacity while structural support to withstand high temperature applications and still be sized to fit within existing pumps.

In one example, the valve cage is constructed from a material including a polyamide resin and fiberglass. One suitable polyamide resin is polyamide 11, such as that sold under the trade designation RILSAN, available from the Arkema Group of Paris, France, with locations throughout the world. In the example where the valve cage is constructed out a material including polyamide 11 and fiberglass, the fiberglass content is approximately six percent of the material. This material along with the design of the example provides a valve housing 62 resistant to damage from high temperature applications.

The present invention has now been described with reference to several embodiments. The foregoing detailed description and examples have been given for clarity of understanding only. Those skilled in the art will recognize that many changes can be made in the described embodiments without departing from the scope and spirit of the invention. Thus, the scope of the present invention should not be limited to the exact details and structures described herein, but rather by the appended claims and equivalents.

I claim:

1. A valve assembly comprising:
    a housing comprising polyamide 11 and on the order of 6 percent fiberglass, the housing including:
    a first support ring,
    a second support ring,
    a valve seat disposed proximate the first support ring, the valve seat having a passage through the valve seat, the passage having a diameter, and
    more than four legs extending between the first support ring and the second support ring, the legs arranged circumferentially such that the legs are substantially equally spaced around the housing, wherein the legs each have an angular width of approximately one-seventh of the diameter of the passage; and
    a valve mechanism supported within the housing and having an open position and a closed position, the valve mechanism constructed and arranged such that when in the open position, fluid is allowed to flow through the valve mechanism into the housing and exit the housing between the more than four legs.

2. The valve assembly of claim 1 wherein the housing further includes a stop ring operably disposed between the first support ring and the second support ring, the stop ring defining the open position of the valve mechanism.

3. The valve assembly of claim 1 wherein the valve mechanism comprises:
    a valve plate; and
    a spring acting between the housing and the valve plate to bias the valve plate against the valve seat.

4. The valve assembly of claim 3 wherein the valve plate of the valve mechanism is stemless.

5. The valve assembly of claim 3 wherein the housing further includes a spring guide constructed and arranged to maintain a proper position of the spring within the housing.

6. The valve assembly of claim 1 wherein the second support ring is constructed and arranged for holding the valve seat.

7. The valve assembly of claim 6 wherein the second support ring holds the valve seat via a snap-fit relationship.

8. The valve assembly of claim 1 wherein the more than four legs comprises six legs.

9. A valve assembly comprising:
    a housing comprising polyamide 11 and on the order of 6 percent fiberglass, the housing including:
    a first support ring;
    a second support ring; and
    more than four legs extending between the first support ring and the second support ring, the legs arranged circumferentially such that the legs are substantially equally spaced around the housing; and,
    a valve mechanism supported within the housing and having an open position and a closed position, the valve mechanism constructed and arranged such that when in the open position, fluid is allowed to flow through the valve mechanism into the housing and exit the housing between the more than four legs.

* * * * *